United States Patent [19]

Malhotra

[11] Patent Number: 4,530,981

[45] Date of Patent: Jul. 23, 1985

[54] PROCESS FOR MAKING TETRAFLUOROETHYLENE FINE POWDER

[75] Inventor: Satish C. Malhotra, Parkersburg, W. Va.

[73] Assignee: E. I. Du Pont de Nemours and Company, Wilmington, Del.

[21] Appl. No.: 639,943

[22] Filed: Aug. 13, 1984

[51] Int. Cl.$^3$ .................. C08F 14/18; C08F 14/26
[52] U.S. Cl. ...................... 526/73; 526/247; 526/249; 526/250; 526/252; 526/253; 526/254; 526/255
[58] Field of Search ............ 526/73, 247, 249, 250, 526/252, 253, 254, 255

[56] References Cited

U.S. PATENT DOCUMENTS

| | | | |
|---|---|---|---|
| 3,624,064 | 11/1971 | Toyoda et al. | 526/73 |
| 4,098,975 | 7/1978 | Shimizu et al. | 526/255 |
| 4,141,874 | 2/1979 | Oka et al. | 526/255 |
| 4,363,900 | 12/1982 | Shimizu et al. | 526/83 |

FOREIGN PATENT DOCUMENTS

| | | |
|---|---|---|
| 0031268 | 7/1981 | European Pat. Off. . |
| 51-135927 | 11/1976 | Japan . |
| 1545675 | 5/1979 | United Kingdom . |

*Primary Examiner*—Harry Wong, Jr.

[57] ABSTRACT

Tetrafluoroethylene fine powder resins are made by adjusting temperature during polymerization wherein:
(a) at the beginning of the polymerization the temperature is between 70°–90° C.,
(b) when between 5–30% of the total amount of tetrafluoroethylene has been polymerized, the temperature is raised to between 100°–125° C.,
(c) after 20–80% of the total tetrafluoroethylene has been polymerized and after step (b) has been carried out, the temperature is lowered by at least 30° C. from the temperature used in step (b).

3 Claims, No Drawings

PROCESS FOR MAKING TETRAFLUOROETHYLENE FINE POWDER

FIELD OF THE INVENTION

This invention relates to a process for making tetrafluoroethylene (TFE) fine powder resins, and particularly to such resins that have good stretch performance.

BACKGROUND OF THE INVENTION

Tetrafluoroethylene (TFE) fine powder resins are non-melt-fabricable and are commonly processed by paste extrusion wherein the powder is mixed with a lubricant and is then discharged through a paste extruder to obtain films, tubes, tapes, protective coating on wire and the like.

Such paste extruded films, tubes and tapes can be rapidly stretched in unsintered form to form a strong material that is porous to water vapor but not to liquid water. Such a material is useful in providing "breathable" fabric material for garments, tenting, separatory membranes and the like.

It is desirable to prepare improved TFE fine powder resins having good stretchability in unsintered form after paste extrusion to obtain the strong breathable material described above. This invention is directed to the preparation of such resins by a process that produces resin at high reaction rates.

SUMMARY OF THE INVENTION

This invention provides a process for preparing unsintered tetrafluoroethylene fine powder resins which comprises polymerizing tetrafluoroethylene, and, optionally, a small amount of at least one selected copolymerizable fluorinated ethylenically unsaturated comonomer, in an aqueous medium in the presence of a substantially non-telogenic anionic surfactant present in an amount which maintains colloidal particles of polymerization product in dispersed form, said process being carried out by contacting tetrafluoroethylene and, optionally, selected comonomer, in said aqueous medium in the presence of at least one tetrafluoroethylene polymerization initiator, wherein the temperature at which polymerization is carried out is varied as follows:

(a) at the beginning of the polymerization the temperature is between 70°–90° C.,
(b) when between 5–30% of the total amount of tetrafluoroethylene has been polymerized, the temperature is raised to between 100°–125° C.,
(c) after 20–80% of the total tetrafluoroethylene has been polymerized and after step (b) has been carried out, the temperature is lowered by at least 30° C. from the temperature used in step (b).

DESCRIPTION OF THE INVENTION

The polytetrafluoroethylene resins of this invention are referred to by those skilled in the art as tetrafluoroethylene fine powder resins. The term "fine powder" has attained a special meaning in the art. It means that the resin has been prepared by the "aqueous dispersion polymerization" process. In this process sufficient dispersing agent is employed and agitation is mild in order to produce small colloidal size particles dispersed in the aqueous reaction medium. Precipitation (i.e., coagulation) of the resin particles is avoided during the polymerization.

There is another polytetrafluoroethylene material called "granular polytetrafluoroethylene resin" which is prepared by polymerizing tetrafluoroethylene by a process in which little or no dispersing agent is employed and agitation is carried out vigorously in order to produce a precipitated resin. This process is called "suspension polymerization".

The two polymerization procedures produce distinctly different products. The "granular" product can be molded in various forms, whereas the "fine powder" produced by the aqueous dispersion method cannot be molded but must be fabricated by dispersion coating or by adding a lubricant for paste extrusion. In contrast, granular resin is incapable of being paste extruded.

Tetrafluoroethylene may be polymerized alone in the process of this invention to obtain a fine powder homopolymer resin of the invention. In addition, tetrafluoroethylene may be copolymerized with copolymerizable fluorinated ethylenically unsaturated comonomer provided the amount of comonomer is not sufficient to cause the resulting polymer to become melt-fabricable.

Representative copolymerizable fluorinated ethylenically unsaturated comonomers are represented by the formulas

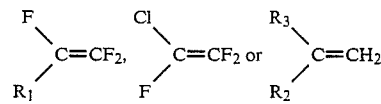

wherein $R_1$ is $-R_f$, $-R_f-X$, $-O-R_f$ or $-O-R_f-X$ in which $-R_f$ is a perfluoroalkyl radical of 1–10 carbon atoms, $-R_f-$ is a linear perfluoroalkylene diradical of 1–10 carbon atoms in which the attaching valences are at each end of the linear chain, and X is H or Cl; and $R_2$ is F, $-R_f$ or $-R_f-X$, and $R_3$ is H or F, or of the formula

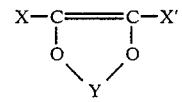

where Y is

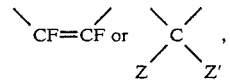

X and X' are F or Cl, and Z and Z' are each alkyl or perfluoroalkyl of 1–6 carbon atoms.

Representative copolymerizable fluorinated ethylenically unsaturated comonomer includes hexafluoropropylene, perfluorohexene-1, perfluorononene-1, perfluoro(methyl vinyl ether), perfluoro(n-propyl vinyl ether), perfluoro(n-heptyl vinyl ether), perfluoromethyl ethylene, perfluorobutyl ethylene, ω-hydroperfluoropentene-1, 3-hydroperfluoro(propyl vinyl ether), and the like, or mixtures thereof such as a mixture of hexafluoropropylene and perfluoro(propyl vinyl ether). Preferably the comonomers are selected from perfluoro(alkyl vinyl ethers) of the formula $R_f-O-CF=CF_2$; or perfluoro (terminally unsaturated olefins) of the formula $R_f-CF=CF_2$; or perfluoroalkyl ethylenes of the formula $R_f-CH=CH_2$, wherein $R_f$ is perfluoroalkyl of 1–10 carbon atoms.

By the term "non-melt-fabricable" is meant a tetrafluoroethylene polymer or copolymer whose melt viscosity is so high that the polymer cannot be easily extruded by melt fabricating techniques. Generally the higher the molecular weight of the polymer, the higher the melt viscosity. A melt viscosity above which tetrafluoroethylene polymers or copolymers are non-melt-fabricable is $1 \times 10^9$ poises. The melt viscosities of non-melt-fabricable polymers are so high that molecular weights are usually measured indirectly by a procedure which gives the standard specific gravity (SSG) of the resin. The SSG of the resin varies inversely with molecular weight; as the molecular weight increases, the numerical value of the SSG decreases.

In the process of this invention, tetrafluoroethylene monomer, along with ethylenically unsaturated comonomer if desired, is admixed or contacted with an aqueous medium containing dispersing agent and polymerization initiator. Polymerization pressure is not critical, but practically may be of 8–40 kg/cm$^2$, preferably 25–40 kg/cm$^2$. The polymerization is ordinarily carried out in a gently stirred autoclave.

The dispersing agents used are anionic, substantially nontelogenic dispersing agents. Commonly employed dispersing agents are fluorinated carboxylates containing 7–20 carbon atoms, such as ammonium polyfluorocarboxylates. The amount of dispersing agent present will be sufficient to stabilize the colloidal dispersion. It may be ordinarily between about 1000 ppm and about 5000 ppm based on weight of water employed in the aqueous dispersion. The dispersing agent may be added prior to initiation of polymerization or may be added in increments as described in Punderson U.S. Pat. No. 3,391,099.

If desired, a paraffin wax (i.e., a saturated hydrocarbon having more than 12 carbon atoms) that is liquid at the polymerization temperature may be employed as described in Bankoff U.S. Pat. No. 2,612,484. Usually, the wax is employed in an amount between 0.1%–12% by weight of water in the aqueous dispersion.

Polymerization is effected by mixing the foregoing described ingredients under the conditions specified above. Mixing is ordinarily carried out by mildly agitating the aqueous polymerization mixture. Agitation is controlled to aid in preventing premature coagulation of resin particles produced in the polymerization. Polymerization is ordinarily conducted until the solids level (i.e., polymer content) of the aqueous mixture is between about 15 and 60 percent by weight of the mixture.

By the term "substantially non-telogenic" used in the definition of the dispersing agent is meant that the polymer produced has an SSG (standard specific gravity) substantially the same as the SSG of a polymer produced without the dispersing agent present. SSG is a means of measuring the molecular weight of the polymer produced.

Any suitable initiator for polymerization of tetrafluoroethylene may be employed. Ammonium persulfate, potassium persulfate and disuccinic acid peroxide are common initiators. Combinations of peroxide with an appropriate reducing agent may be used as a redox system.

The initiator may be added as a precharge or after monomer pressure up. The amount added to the polykettle may vary depending on the molecular weight of the product desired. Generally, this amount is 0.002–0.02 g/l, preferably 0.004–0.02 g/l based on water for APS and 0.05–0.5 g/l for DSP.

A three-step temperature profile is employed in the present invention. As a first step, the polymerization is started at a relatively low temperature of 70°–90° C. After start of polymerization, or preferably after about 5–30% of the total amount of TFE has been polymerized, the temperature is raised to 100°–125° C. as the second step. The temperature is dropped in the third step by at least 30° C. beginning after about 20–80% of the total TFE has been polymerized. This increases the reaction time by at least 12%. The drop in the temperature is aided by addition of cold water into the polykettle during the polymerization.

Non-melt-fabricable tetrafluoroethylene fine powder resins produced by the process of this invention exhibit excellent stretchability to result in a stretched material that is strong and breathable but impervious to liquid water. The resins are of high molecular weight, having an SSG of less than 2.190. They have a high rheometer pressure which is at least 250 kg/cm$^2$. They have a primary particle size between 0.1 and 0.5 micron. By "primary" is meant the size of the colloidal resin particles measured prior to coagulation.

The resins of this invention are useful in any of the paste extrusion applications that known tetrafluoroethylene fine powder resins are useful.

TEST PROCEDURES (1) Raw Dispersion (Primary) Particle Size (Avg)

RDPS was determined from the absorbance (scattering) of a dilute aqueous sample at 546 millimicrons using a Beckman DU spectrophotometer and is based on the principle that the turbidity of the dispersion increases with increasing particle size, as shown in U.S. Pat. No. 4,036,802.

(2) Standard Specific Gravity (SSG)

SSG was measured by water displacement of a standard molded test specimen in accordance with ASTM D1457-69. The standard molded part was formed by preforming 12.0 g of the powder in a 2.86 cm diameter die at a pressure of 352 kg/cm$^2$, followed by the sintering cycle of the preform of heating from 300° C. to 380° C. at 2° C./min, holding at 380° C. for 30 min, cooling to 295° C. at 1° C./min and holding at this temperature for 25 minutes, after which the specimen is cooled to 23° C. (room temperature) and tested for specific gravity.

(3) Rheometer Pressure

Rheometer pressure was measured in accordance with ASTM D1457-81A, section 12.8, except that the resin was not sieved before mixing with kerosene, and the preform was made on a 26 mm diameter extension tube at 300 psi.

(4) Stretch Test a. Preparation of Test Specimen

A sample of the resin was screened through a 2000 microns sieve. One hundred grams of this resin was admixed with the desired amount of Isopar K lubricant at room temperature by shaking in a glass jar of 6 cm inside diameter and rolling for 4 min. at 64 rpm. It was then preformed at room temperature in a tube 26 mm diameter × 23 cm long at 400 psi. The preform was then paste extruded at room temperature through an orifice 2.4 mm in diameter into a uniform beading. Land length of the orifice was 5 mm. The extrusion speed was 84 cm/min. The angle of die was 30°. The beading was dried at 190° C. for 20 minutes.

b. Stretch Test

A beading of resin was cut and clamped at each end leaving a space of 50 mm between clamps, and heated to 300° C. in a circulating air oven. The clamps were then moved apart at the desired rate to the desired length. The stretched specimen was examined for uniformity of stretch, even appearance and surface roughness. The % uniformity was determined by making an ink mark at the center of a paste extruded beading before stretching and measuring its position after stretching. It is calculated as follows:

$$\% \text{ uniformity of stretch} = 100 \times \frac{\text{smaller distance from ink mark to beading edge after stretch}}{\frac{1}{2}\text{total length after stretch}}$$

EXAMPLES

Example 1

A 36-liter polykettle was charged with 17.7 kg of demineralized water, 600 g paraffin wax, 10 g succinic acid, 13 g ammonium perfluorooctanoate (C-8) dispersing agent, and 0.15 g zinc chloride. The contents of the polykettle were heated to 65° C., evacuated, and $N_2$ purged. The contents of the polykettle were agitated. The temperature was increased to 75° C. Tetrafluoroethylene (TFE) was then added to the polykettle after evacuation until the pressure was $2.75 \times 10^6$ Pa. One hundred twenty (120) ml ammonium persulfate (1 g/l) was added at 100 ml/min. After the polymerization began, as evidenced by a drop in pressure, tetrafluoroethylene was added to maintain the pressure at $2.75 \times 10^6$ Pa. After 0.9 kg TFE had reacted (5.5% of total TFE polymerized) a solution of 45 g C-8 in 1000 ml water was pumped in at 50 ml/min. After 2.27 kg TFE had reacted (14% of total TFE reacted), the polykettle temperature was increased to 113° C. After 6.8 kg TFE had reacted (41.5% of total TFE reacted), the polykettle temperature was slowly lowered to 73° C., using cold water addition at 100 ml/min. after 10 kg TFE had reacted. The final temperature of 73° C. was reached when 95% of the TFE had reacted. After 16.36 kg TFE had reacted, the feed was stopped and the polykettle was vented, evacuated, and purged with $N_2$. The contents were cooled and discharged from the polykettle. The supernatant wax was removed. The dispersion was diluted to 15% solids and coagulated in the presence of ammonium carbonate under high agitation conditions. The coagulated fine powder was separated and dried at 150°–160° C. for three days.

The polymer properties are given in Table 1. The total reaction time from TFE pressure up to feed off was 88 min compared to 123 min for Comparative Example 1-A, below.

COMPARATIVE EXAMPLE 1-A

Example 1 was repeated, except that:
20.0 kg water was used
a constant temperature of 75° C. was employed throughout the polymerization
14.1 kg TFE total was polymerized
TFE in the polykettle was reacted down to $1.72 \times 10^6$ Pa before venting The polymer properties are given in Table 1. The total reaction time before react down was 123 minutes, which was much longer than in Example 1.

This Example shows that in the absence of the temperature profile of Example 1 the reaction time is substantially longer for satisfactory stretch performance.

COMPARATIVE EXAMPLE 1-B

Comparative Example 1 was repeated, except that:
19 kg water was precharged
60 ml APS solution (1.0 g/l) was added after TFE pressure up
a temperature of 90° C. was used throughout
a total of 16.36 kg TFE were reacted
the polykettle was vented without reacting down The polymer properties are given in Table 1. The total reaction time was 93 minutes.

This Example shows that in the absence of the temperature profile of Example 1 a short reaction time is accompanied by declining stretch performance.

COMPARATIVE EXAMPLE 1-C

Example 1 was repeated, except that:
The second step temperature was 106° C.
The temperature was not decreased (no third step) and the reaction was terminated at 106° C.

The polymer properties are given in Table 1. The total reaction time was 193 minutes, which was much longer than in Example 1.

This Example shows that in the absence of the temperature profile of Example 1, the reaction time is substantially longer for satisfactory stretch performance.

EXAMPLE 2

The polykettle described in Example 1 was charged with 19.1 kg demineralized water, 855 g paraffin wax, 0.15 g zinc chloride, 2.6 g (dry basis) disuccinic acid peroxide, 0.044 g iron powder, 0.02 g copper powder, and 30 g C-8. The contents of the polykettle were heated to 80° C., evacuated, and $N_2$ purged. The contents of the polykettle were agitated. TFE was then added to the polykettle after evacuation until the pressure was $2.75 \times 10^6$ Pa. After the polymerization began, TFE was then added to maintain the pressure at $2.75 \times 10^6$ Pa. After 0.9 kg TFE had reacted (6.4% of total TFE) a solution of 20 g C-8 in 1000 ml water was pumped in at 50 ml/min. After 2.27 kg TFE had reacted (16% of total TFE) the polykettle temperature was increased to 116° C. After 9.5 kg (67% of total TFE) the polykettle temperature was decreased to 77° C., using cold water addition at 100 ml/min. The final temperature of 77° C. was reached when 100% of the TFE had reacted. After 14.1 kg TFE had reacted, the feed was stopped and the polykettle was vented.

The polymer properties are given in Table 1. The total reaction time was 83 min compared to 172 minutes for Comparative Example 2-A.

COMPARATIVE EXAMPLE 2-A

Example 2 was repeated, except that:
a constant temperature of 80° C. was used
10 g C-8/1000 ml water was pumped after 0.91 kg TFE had reacted
16.36 kg total TFE was polymerized The polymer properties are given in Table 1. The total reaction time was 172 minutes.

This Example shows that in the absence of the temperature profile of Example 2 the reaction time is substantially longer for satisfactory stretch performance.

COMPARATIVE EXAMPLE 2-B

Example 2 was repeated, except that:
The initial polymerization temperature was 110° C.
After 6.8 kg TFE had reacted (48% of total TFE), the temperature was decreased to 74° C. The final temperature of 74° C. was reached when 100% of the TFE had reacted.

The polymer properties are given in Table 1. The total reaction time was 72 minutes but the resin stretch performance was inferior.

This Example shows that in the absence of the temperature profile of the invention, the resin performance is inferior.

EXAMPLE 3

Example 2 was repeated, except that:
2 g succinic acid was used as precharge
600 g wax was used
2.3 g (dry basis) disuccinic acid peroxide was used as precharge
25 g C-8 in 1000 ml water was injected at 100 ml/min.
After 1.36 kg TFE had reacted the temperature was increased to 114° C. When the temperature reached 110° C., the pressure was lowered to $2.06 \times 10^6$ Pa
After 6.8 kg TFE had reacted (55% of total TFE) the temperature was dropped to 70° C., using cold water addition to the polykettle at 100 ml/min; the final temperature of 70° C. was reached when 69% of the TFE had reacted.
When the temperature reached 100° C. during the drop, the pressure was increased to $2.75 \times 10^6$ Pa.
The total TFE reacted was 12.3 kg.
The polymer properties are given in Table 1.

This Example shows that even when lower polymerization pressure is used for part of the run, the resin stretch performance is not unsatisfactory when the temperature profile of the present invention is used.

TABLE 1

|  | Examples | | | Comparatives | | | | |
| --- | --- | --- | --- | --- | --- | --- | --- | --- |
|  | Ex. 1 | Ex. 2 | Ex. 3 | C-1-A | C-1-B | C-2A | C-1-C | C-2-B |
| Total Reaction Time, min (1) | 88 (2) | 83 (3) | 128 (5) | 123 (3) | 93 (2) | 172 (2) | 193 (2) | 72 (3) |
| RDPS, micron | 0.210 | 0.246 | 0.234 | 0.252 | 0.237 | 0.260 | 0.262 | 0.196 |
| SSG | 2.189 | 2.166 | 2.181 | 2.166 | 2.168 | 2.165 | 2.161 | 2.180 |
| Rheometer Pressure, kg/cm² (RR = 400:1) | 311 | 325 | 330 | 390 | 295 | 379 | 352 | 369 |
| Pa ($\times 10^{-6}$) | 30.3 | 31.7 | 32.2 | 38.1 | 28.8 | 37.0 | 34.4 | 36.0 |
| % Uniformity of Stretch at lubricant loading of 17% and stretch rate of 100%/sec | 96 A | 93 A | 82 B | 97 A | 79 B | 92 A | 95 A | 46 C |

(1) From TFE pressure up to TFE feed off.
(2) TFE reacted is 16.36 kg.
(3) TFE reacted is 14.1 kg.
(4) TFE reacted is 15.45 kg.
(5) TFE reacted is 12.3 kg.
A Smooth even appearance
B Slightly uneven appearance
C Uneven appearance

I claim:

1. A process for polymerizing tetrafluoroethylene in an aqueous medium in the presence of a substantially non-telogenic anionic surfactant present in an amount which maintains colloidal particles of polymerization product in dispersed form, said process being carried out by reacting tetrafluoroethylene in said aqueous medium in the presence of at least one tetrafluoroethylene polymerization initiator wherein the temperature at which polymerization is carried out is varied as follows:
    (a) at the beginning of the polymerization the temperature is between 70°–90° C.,
    (b) when between 5–30% of the total amount of tetrafluoroethylene has been polymerized, the temperature is raised to between 100°–125° C.,
    (c) after 20–80% of the total tetrafluoroethylene has been polymerized and after step (b) has been carried out, the temperature is lowered by at least 30° C. from the temperature used in step (b).

2. The process of claim 1 wherein a copolymerizable fluorinated ethylenically unsaturated comonomer is present.

3. The process of claim 2 wherein the comonomer is of the formula $$\begin{array}{ccc} F & Cl & R_3 \\ \diagdown & \diagdown & \diagdown \\ C=CF_2, & C=CF_2 \text{ or} & C=CH_2 \\ \diagup & \diagup & \diagup \\ R_1 & F & R_2 \end{array}$$

wherein $R_1$ is $-R_f$, $-R_f-X$, $-O-R_f$ or $-O-R_f-X$ in which $-R_f$ is a perfluoroalkyl radical of 1–10 carbon atoms, $-R_f-$ is a linear perfluoroalkylene radical of 1–10 carbon atoms in which the attaching valences are at each end of the linear chain, and X is H or Cl; and $R_2$ is F, $-R_f$ or $-R_f-X$, and $R_3$ is H or F, or of the formula $$\begin{array}{c} X-C = C-X' \\ | \quad\quad | \\ O \quad\quad O \\ \diagdown \diagup \\ Y \end{array}$$

where Y is $$\diagdown \diagup \quad \diagdown \diagup$$
$$CF=CF \text{ or } C$$
$$\diagup \diagdown \quad \diagup \diagdown$$
$$Z \quad Z' \quad Z \quad Z'$$

X and X' are F or Cl, and Z and Z' are each alkyl or perfluoroalkyl of 1–6 carbon atoms.

* * * * *